United States Patent [19]

Mayer

[11] Patent Number: 5,226,656
[45] Date of Patent: Jul. 13, 1993

[54] WHEELED CARRIER FOR PANEL MATERIALS

[76] Inventor: Donald G. Mayer, 7030 Filbert Ave., Orangevale, Calif. 95662

[21] Appl. No.: 907,390

[22] Filed: Jul. 1, 1992

[51] Int. Cl.⁵ .................. B62B 3/02; B62B 3/04; B62B 3/10
[52] U.S. Cl. .................. 280/79.2; 280/79.3; 280/79.7; 280/47.16; 269/17; 269/905; 414/498
[58] Field of Search .......... 280/79.2, 79.7, 47.131, 280/47.16, 47.18, 47.19, 47.2, 47.26, 47.34, 79.11, 79.3; 269/17, 309, 905; 414/498

[56] References Cited

U.S. PATENT DOCUMENTS

| | | | |
|---|---|---|---|
| D. 162,230 | 2/1951 | Sasser | D14/3 |
| D. 310,894 | 9/1990 | Smith | D34/23 |
| 503,982 | 8/1893 | Owen | 280/47.16 |
| 1,239,498 | 9/1917 | Madigan | 280/47.16 X |
| 2,447,028 | 8/1948 | Riddick | 280/79.2 X |
| 2,799,409 | 7/1957 | Kelly | 280/47.16 X |
| 2,808,157 | 10/1957 | Terrill | 280/47.34 X |
| 2,819,908 | 1/1958 | Jackson et al. | 280/79.2 |
| 2,947,565 | 8/1960 | Wood | 280/79.11 X |
| 3,003,788 | 10/1961 | Grymer | 280/79.7 X |
| 3,125,353 | 3/1964 | Gohmann | 280/79.2 X |
| 3,423,101 | 1/1969 | Boeye | 280/79.2 X |
| 3,542,220 | 11/1970 | Propst | 280/79.2 X |
| 3,580,601 | 5/1971 | Miles | 280/47.131 |
| 3,643,935 | 2/1972 | Bell | 269/17 X |
| 3,841,651 | 10/1974 | Bigney | 280/47.16 |
| 3,999,775 | 12/1976 | Brongo | 280/79.2 |
| 4,488,733 | 12/1984 | Hellsten | 280/47.16 |
| 4,630,838 | 12/1986 | Stockton | 280/47.17 |
| 4,679,805 | 7/1987 | Cunningham | 280/33.991 |
| 4,793,624 | 12/1988 | Mace | 280/47.16 |
| 4,978,132 | 12/1990 | Wilson et al. | 280/47.131 |

Primary Examiner—Brian Johnson
Attorney, Agent, or Firm—James M. Ritchey

[57] ABSTRACT

A movable dolly or carrier for transporting doors, windows, or other construction panels. A wheeled base includes panel support members and a reversibly attached storage compartment.

6 Claims, 4 Drawing Sheets

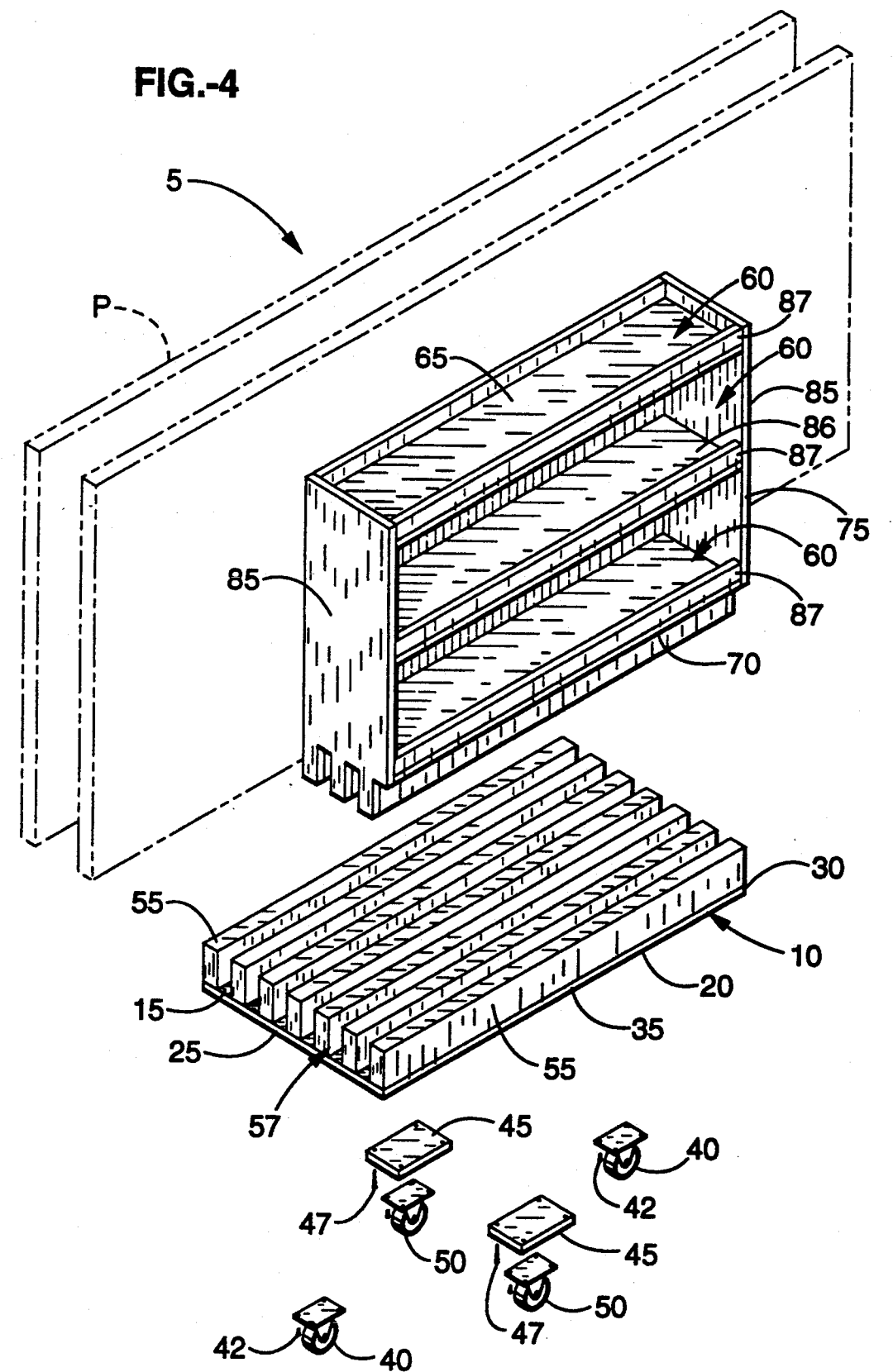

WHEELED CARRIER FOR PANEL MATERIALS

BACKGROUND OF THE INVENTION

1. Field of the Invention

Related i a hand-operated, wheeled carrier device. Specifically, a hand cart for transporting panels is disclosed. The subject apparatus comprises an elongated, wheeled body with longitudinal slots or support members to accommodate doors or construction materials, and a detachable storage area that fits over or interacts with some of the slots when attached.

2. Description of the Background Art

A variety of inventions have been disclosed for carriers, hand trucks, carts, and dollies designed for transporting heavy paneled articles such as building boards, counter tops, doors, mirrors, windows, sheet rock, and the like. However, none heretofore has addressed a movable carrier having a reversibly attachable storage compartment allowing transportation of tools and equipment as well as heavy paneled articles on the same apparatus.

U.S. Pat. No. Des. 162,230 discloses a design for a mirror handling truck having an elongated base frame with four wheels affixed to the lower surface of the base, and a plurality of U-shaped support members mounted vertically and longitudinally to the upper surface of the base. Mirrors are accommodated between the vertical U-shaped support members.

In U.S. Pat. No. 3,580,601 a skate device for moving large panel objects is described, having an elongated base member with three brackets mounted in a line down the long axis of the base to hold and clamp a panels within the brackets. Three rollers are affixed in a line to the lower surface of the base, with the central roller protruding slightly so as to bear the weight when level.

A wheeled support platform is related in U.S. Pat. No. 3,841,651, having an elongated base with wheels fixed in a line longitudinally on the lower surface of the base, the central wheel being slightly larger so as to bear the weight when the platform is held level. A single U-shaped support member is mounted vertically on top of the base, with a central vertical bar containing a clamp to hold the panel article.

U.S. Pat. No. 4,488,733 presents a wheeled plate carrier having an elongated base with a large fixed central wheel, and two small pivoting casters at the ends. A single U-shaped support member runs along the long axis of the upper surface of the base. While resting, the support member sits at an angle slightly off vertical, but can be easily raised to vertical to facilitate transporting panel objects through doorways.

Described in U.S. Pat. No. 4,630,838 is a sheet material carrier having an L-shaped, elongated base, a fixed wheel and a pivoting wheel mounted on the long axis of the lower surface of the base, and a single vertical U-shaped support member. The support member and transported articles rest under the arm of the person operating the carrier, allowing the person to use the other arm to open doors and the like.

U.S. Pat. No. 4,679,805 discloses a space saving cart having a base frame with a split level platform with four wheels on the lower surface and a single U-shaped vertical support member. The carts can be stored so that the lower portion of the base of one cart slides beneath the higher portion of the base of an adjacent cart.

U.S. Pat. No. 4,793,624 presents a cart having a removable vertical support member, which allows transportation of panel materials when the support member is in place, and moving of bulky objects on the base of the cart when the support member is removed.

Most recently, U.S. pat. No. 4,978,132 discloses a pivotable hand truck having an L-shaped structure with a larger fixed wheel at the corner, and a smaller pivoting wheel near one of the ends, so that the panel article can be pivoted easily rom vertical to horizontal. A pedal-operated height adjusting member is attached so that the position of the panel can be adjusted before releasing from the carrier.

SUMMARY OF THE INVENTION

An object of the present invention is to provide a hand-operated movable carrier for facile transportation of heavy panel articles such as doors, windows, mirrors, sheet rock, countertops, and the like.

A further, more specific object of the present invention is to provide a hand-operated movable carrier having a reversibly attachable storage compartment so that tools and equipment may, at the operator's option, be transported with the heavy panel articles.

Another object of the present invention is to present a hand-operated movable carrier having slightly raised or protruding central wheels and slightly inset front and back wheels so that the carrier rests on the central wheels when resting or when the base is level, and allowing for facile movement of the carrier over door jams, cables, cords, hoses, and the like.

Still another object of the present invention is to provide a hand-operated movable carrier having a plurality of slots in the base or support members attached to the base so that several heavy panel objects can be transported simultaneously.

Disclosed is a hand-operated movable carrier for transporting heavy panel articles comprising a wheeled base member having an upper surface, a lower surface, front and back edges, and side edges. The base member has mounted on or located proximate its lower surface wheels mounted longitudinally, and wheels mounted transversely, with the transverse wheels protruding slightly so as to bear the weight of the carrier when the base member is level. On the upper surface of the base member are slots or support members running longitudinally to accommodate the heavy panel articles. A reversibly attachable storage compartment fits over or interacts with some or all of the slots or support members.

Other objects, advantages, and novel features of the present invention will become apparent from the detailed description that follows, when considered in conjunction with the associated drawings.

BRIEF DESCRIPTION OF THE DRAWINGS

FIG. 4 is a exploded view of the subject invention.

DESCRIPTION OF THE PREFERRED EMBODIMENT

Figure 1:
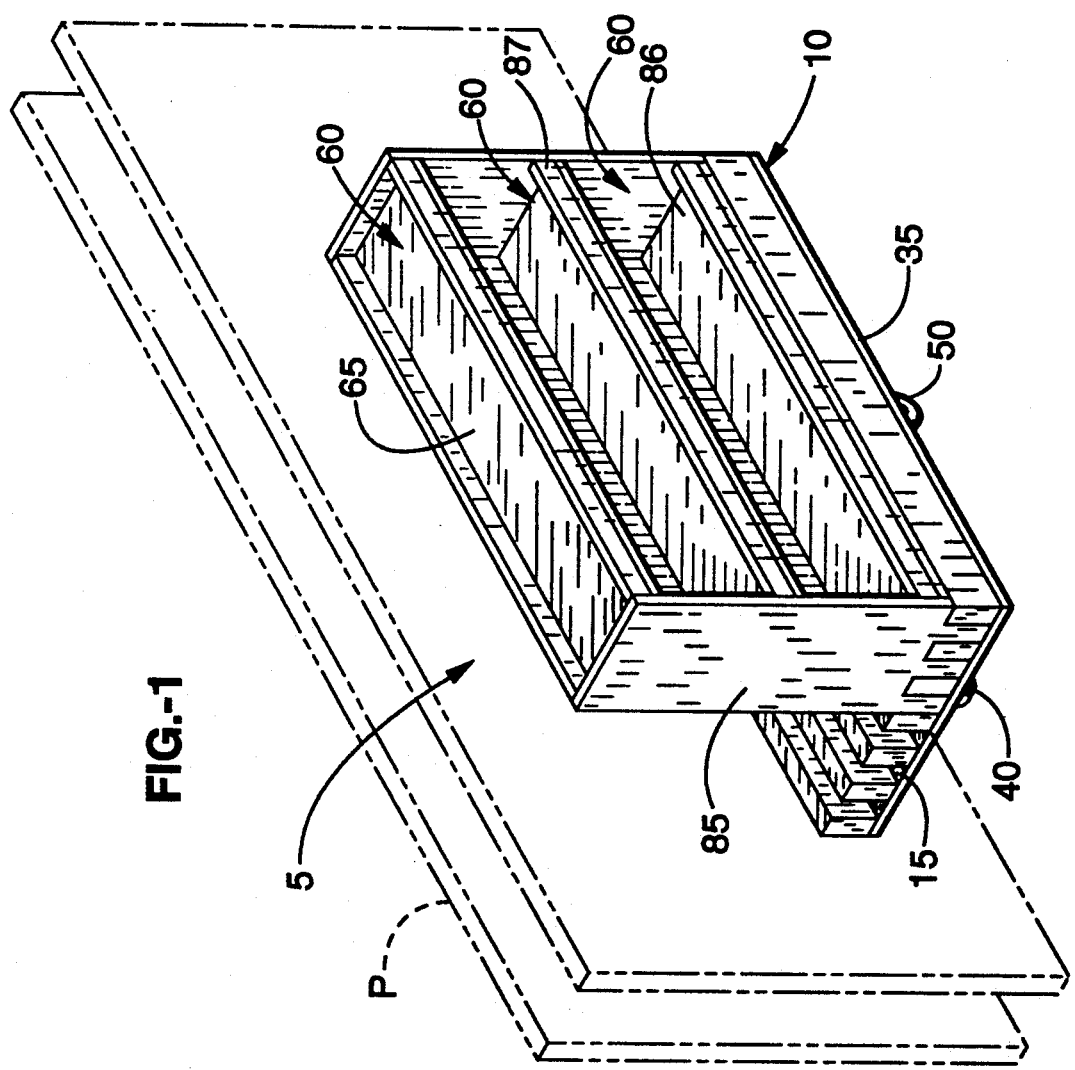
FIG. 1 is a perspective view of the subject invention.

Referring now to FIGS. 1-4, there is shown a preferred embodiment of a wheeled carrier apparatus for transporting panel materials. Usually, but no exclusively, the panel materials are construction-related materials such as doors, windows, mirrors, counter tops, sheet rock, dry wall, and the like. Comprising the subject invention 5 is a generally flat base member 10, preferably rectangular in shape, and a reversibly attachable storage are 60, shown here as generally rectangular in shape. FIGS. 1 and 4 show the storage area bottom surface 70 as being dove-tailed in shape to reversibly attach to the base member upper surface 15. It is understood, however, that equivalent attachment means such as clamps, clips, screws, bolts, configurations designed to enhance friction or tension, or any other reversible fastening means used in the art are considered to be within the scope of this disclosure.

As shown, the storage area 60 is equal in length to the base member 10. Other carrier configurations may involve a storage area that is longer than the base member and protrudes out over the base member front edge 25, the base member back edge 30, or both. Alternatively, the storage area may be shorter in length than the base member, leaving additional base member upper surface 15 exposed adjacent to one or both of the storage area side surfaces 85. The storage area 60 may be positioned at either side of the base member 10, or towards the middle of the base member 10 to allow transporting of panel articles in front of and behind the storage area 60.

The base member 10 has a generally planar upper surface 15, a generally planar lower surface 20, and usually four edges, shown in FIGS. 1–4 as the base front edge 25, base rear edge 30, and base side edges 35. The carrier apparatus as illustrated has mounted on its lower base surface 20 two longitudinally located casters 40, preferably freely pivoting. Two transversely located casters 50, preferably fixed to roll in the longitudinal direction, are mounted to wheel (caster) supports 45, which in turn are mounted on the base member lower surface 20, allowing the weight of the carrier apparatus to rest on the transverse casters when the carrier is in a level position. FIG 4 shows the casters attached to the base lower surface 20 and the caster supports 45 by short screws 42, and the caster mounts attached to the base member lower surface 20 by long screws 47. If desired, the transverse casters 50 could be mounted directly to the base member lower surface 20, and the longitudinal casters then inset into the base member lower surface 20, thus achieving the same affect. Alternatively, the longitudinal casters could be fixed to the base side edges proximate the base lower surface 20 in order to recess the longitudinal casters 40 and thus place the resting weight on the transverse casters 50. It should be readily understood that many other wheel, caster, roller, slide, runner, and skid configurations are contemplated as within the realm of this disclosure, in addition to the arrangement shown in FIGS. 1–4. Means of caster attachment other than screws as shown, are also contemplated, including bolts, welds, adhesives, clamps, and the like.

As shown in FIGS. 1–4, the base member upper surface 15 has attached to it one or more support members 55, preferably rectangular in general shape, oriented in the longitudinal direction. The support members 55 are spaced so as to from slots 57 in conjunction with the base member upper surface, such slots being usually rectangular in shape to accommodate panel articles. Alternatively, a relatively flat base member 10 could have grooves or slots machined directly into the base member upper surface 15 to accommodate panel articles. A variety of slot sizes and shapes are considered, and can be varied to fit a variety of panel materials.

Figure 2:
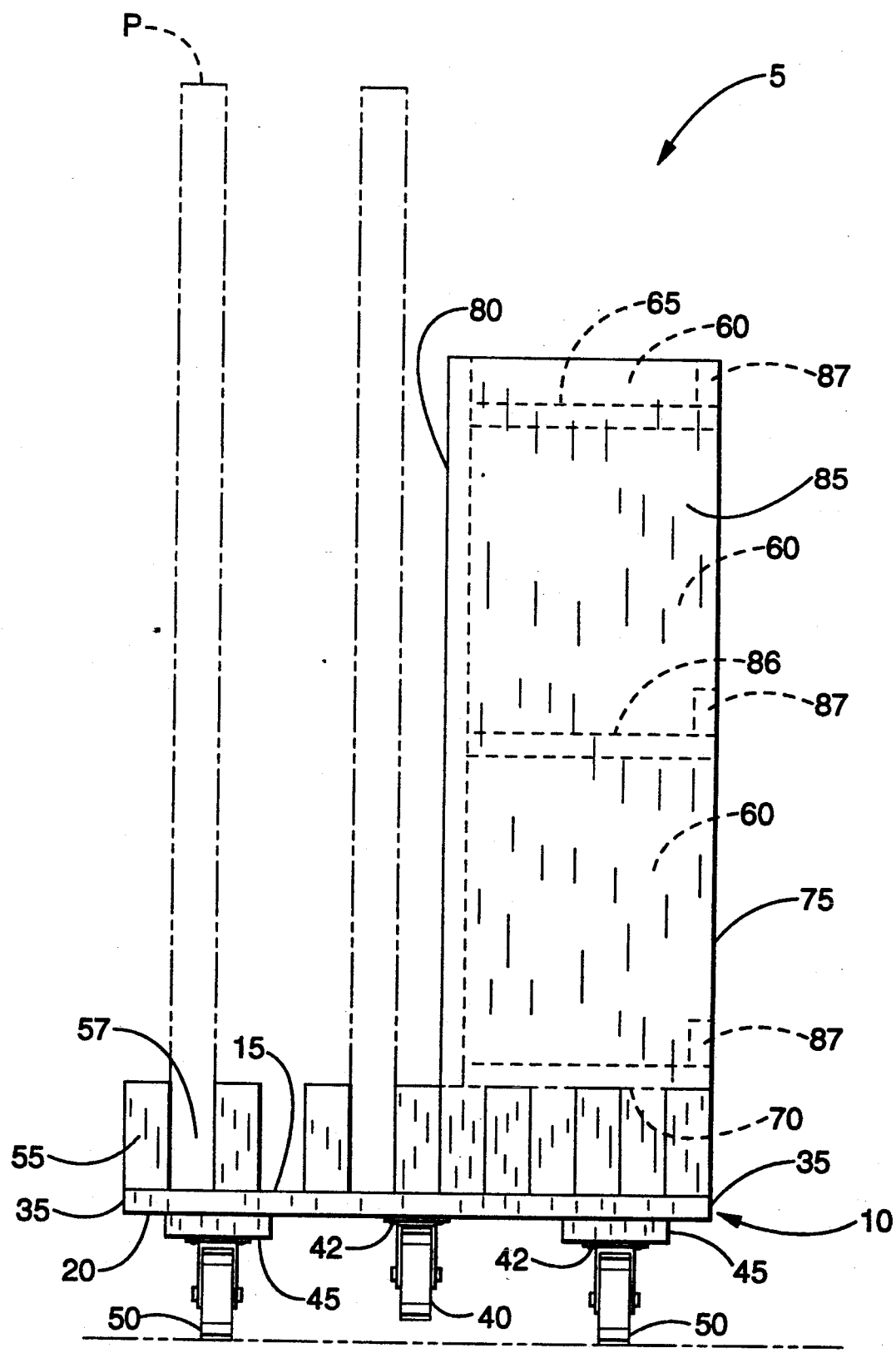
FIG. 2 is an end view of the subject invention.

Panel articles P are shown in FIGS. 1, 2 and 4 in the preferred vertical orientation, perpendicular to the base member 10. Support members 55 and the slots 57 may be designed to hold panel articles in a non-vertical position if desired. The storage area 60 can be attached to the base member in locations and manners that aid in the support of the panel articles P.

The reversibly attachable storage area 60 is preferably rectangular, and comprises an upper shelf surface 65, a lower surface 70, a front surface 75, a rear surface 80, and side surfaces 85. The storage area lower surface 70 is shown in FIGS. 1, 2, and 4 as dove-tailed to interlock with the support members 55 and slots 57 on the base member upper surface 15. If desired, however, the storage area lower surface could be flat, or recessed, or designed in configurations to accommodate various attachment means to the base member 10.

Figure 3:
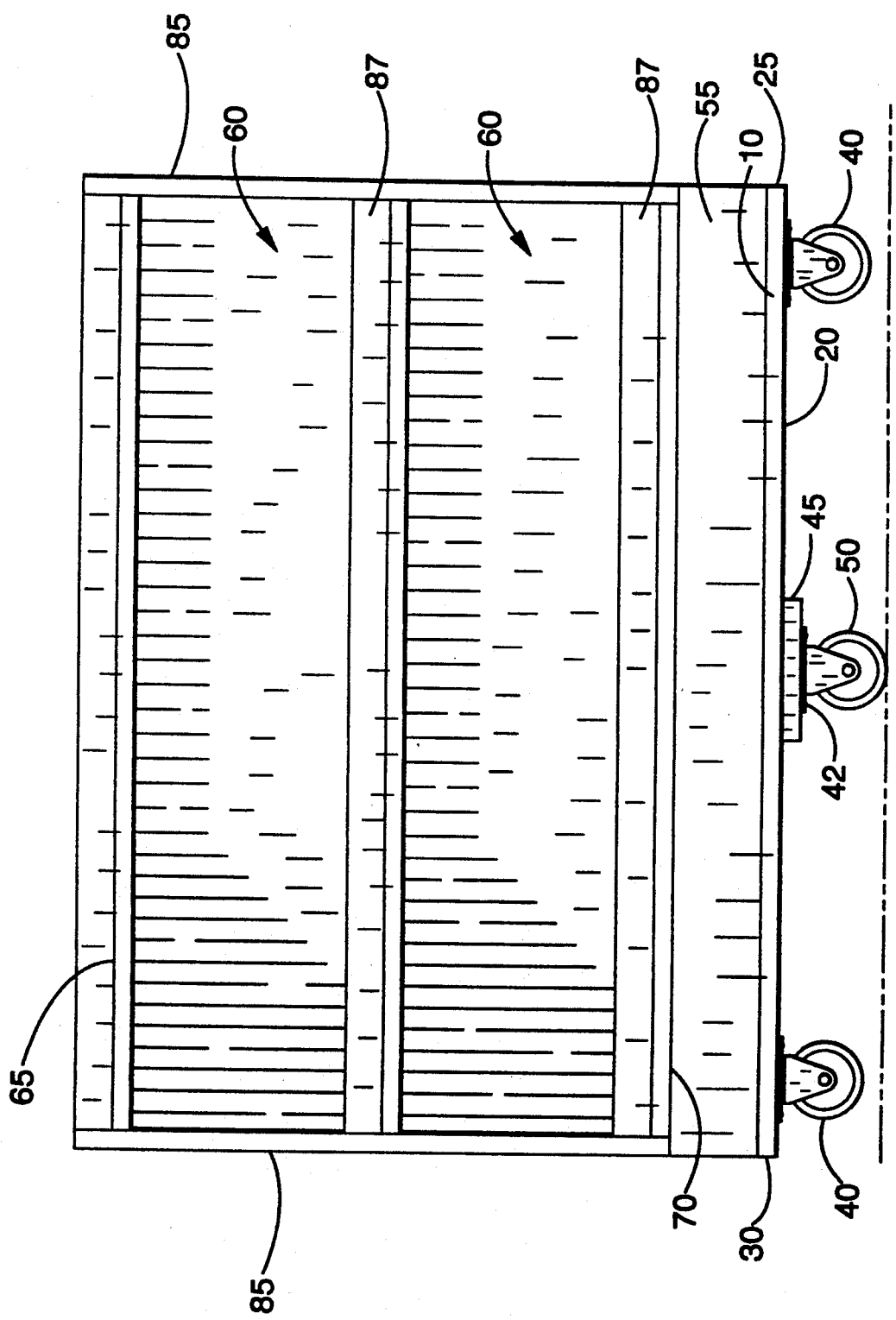
FIG. 3 is a side view of the subject invention.

The reversibly attachable storage area front surface 75 is shown as open in FIGS. 1, 3, and 4, revealing interior shelves 86 for storage of tools, utensils, components, and the like. A wide variety of internal configurations are contemplated for the storage area interior in addition to shelves as shown, including cabinets, drawers, equipment racks, and fixed containers and holders. The storage area front surface 70, instead of being open as shown, could comprise cabinet doors hingedly vertically or horizontally, or a roll-top door.

The upper shelf surface 65 and interior shelves 86 of the storage are 60 are shown with a shelf barrier 87 to prevent tools and other articles from rolling off the shelves during movement of the carrier apparatus. The shelf barriers as shown are level with the storage area front surface 75, but may be recessed or protruded from the front surface 75 as needed to accommodate storage of articles.

The overall carrier apparatus may be constructed of any durable material, preferably metal, wood, natural or synthetic polymers, or combinations thereof.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A movable carrier for transportation of a panel article comprising:
    a) a wheeled base member;
    b) means attached to said base member for supporting in an approximately vertical orientation which is approximately perpendicular to said base member said panel article;
    c) a reversibly attachable storage compartment; and
    d) means for attaching a lower surface of said storage compartment to said base member.

2. A movable carrier for transporting panel articles comprising:
    a) an elongated base member having an upper surface and a lower surface, front and back edges, and side edges;
    b) at least two wheels counted transversely proximate said lower surface of said base member;
    c) at least two swiveling wheels mounted longitudinally proximate said lower surface of said base member, wherein said longitudinally mounted wheels are inset towards said base member lower surface relative to said transversely mounted wheels, so said movable carrier balances on said transversely mounted wheels when said base member is in a level position;

d) means attached to said base member for supporting at least one said panel;

e) a reversibly attachable storage area having an upper shelf surface, a lower surface, and side surfaces;

f) means for attaching said lower surface of said storage area to said base member.

3. A movable carrier according to claim 2, wherein said supporting means comprises at least one longitudinal slot on said upper base member surface for supporting said panel.

4. A movable carrier according to claim 2, wherein said supporting means comprises a plurality of longitudinal slots on said upper surface for supporting said panels.

5. A hand-operated movable carrier for transporting doors, windows, and construction panels which comprises:

a) a flat, elongated base member having an upper surface, a lower surface, front and back edges, and side edges;

b) two longitudinally mounted, freely pivoting casters affixed proximate said lower surface proximate said front and back edges of said base member;

c) two transversely mounted wheel supports affixed to said lower surface of said base member, proximate each of said side edges;

d) two transversely mounted wheels affixed to said transversely mounted wheel supports;

e) a plurality of support members projecting longitudinally from said upper surface of said base member to support said panels;

f) a reversibly attachable storage compartment having an upper shelf surface, a lower surface, a front and a back surface, and side surfaces;

g) a means of attaching said storage compartment to said base member.

6. A hand-operated movable carrier according to claim 5, wherein said storage compartment has said lower surface recessed and said side surfaces spaced apart to span one or more of said longitudinal support members, with said front and back surfaces of said storage compartment spaced apart to extend over a length of said longitudinal support members.

* * * * *